US006888453B2

(12) United States Patent
Lutz et al.

(10) Patent No.: US 6,888,453 B2
(45) Date of Patent: May 3, 2005

(54) ENVIRONMENTAL MONITORING SYSTEM

(75) Inventors: Donald G. Lutz, San Ramon, CA (US); Daniel Duggan, Danville, CA (US)

(73) Assignee: Pentagon Technologies Group, Inc., Livermore, CA (US)

( * ) Notice: Subject to any disclaimer, the term of this patent is extended or adjusted under 35 U.S.C. 154(b) by 0 days.

(21) Appl. No.: 10/177,451

(22) Filed: Jun. 20, 2002

(65) Prior Publication Data

US 2003/0016128 A1 Jan. 23, 2003

Related U.S. Application Data

(60) Provisional application No. 60/300,590, filed on Jun. 22, 2001.

(51) Int. Cl.[7] .......................... G08B 29/00; G06F 11/00

(52) U.S. Cl. ....................................... 340/506; 702/188

(58) Field of Search ........................... 324/72, 74, 525, 324/500, 512, 379; 340/2.4, 531, 506, 507, 514, 517, 540, 310.01, 870.11; 702/1, 31, 32, 57, 116, 188, FOR 158; 700/21, 276; 73/23.2

(56) References Cited

U.S. PATENT DOCUMENTS

| | | | | |
|---|---|---|---|---|
| 3,653,253 A | | 4/1972 | Olin | |
| 4,298,860 A | * | 11/1981 | Norberg et al. | 340/2.4 |
| 4,527,953 A | | 7/1985 | Baker et al. | |
| 4,569,235 A | | 2/1986 | Conkle et al. | |
| 4,682,993 A | | 7/1987 | Todd et al. | |
| 4,909,090 A | | 3/1990 | McGown et al. | |
| 4,941,105 A | | 7/1990 | Marangoni | |
| 4,962,368 A | * | 10/1990 | Dobrzanski et al. | 340/514 |
| 5,125,480 A | | 6/1992 | Gregory et al. | |
| 5,248,933 A | | 9/1993 | Venditti | |
| 5,253,538 A | | 10/1993 | Swick et al. | |
| 5,404,762 A | | 4/1995 | Rodgers et al. | |
| 5,440,301 A | * | 8/1995 | Evans | 340/870.11 |
| 5,501,113 A | | 3/1996 | Harrison et al. | |
| 5,526,576 A | | 6/1996 | Fuchs et al. | |
| 5,591,974 A | | 1/1997 | Troyer et al. | |
| 5,642,284 A | | 6/1997 | Parupalli et al. | |
| 5,872,512 A | * | 2/1999 | Kackman et al. | 340/507 |
| 5,878,377 A | * | 3/1999 | Hamilton et al. | 702/132 |
| 5,892,690 A | * | 4/1999 | Boatman et al. | 700/276 |
| 5,920,392 A | | 7/1999 | Tsai et al. | |
| 5,925,825 A | | 7/1999 | Cochimin | |
| 5,930,744 A | | 7/1999 | Koch et al. | |
| 5,939,647 A | | 8/1999 | Chinn et al. | |
| 5,940,784 A | | 8/1999 | El-Husayni | |

FOREIGN PATENT DOCUMENTS

| | | |
|---|---|---|
| EP | 0 388 993 A1 | 9/1990 |
| JP | 1-245131 | 9/1989 |
| JP | 11-226017 | 8/1999 |

*Primary Examiner*—N. Le
*Assistant Examiner*—Hoai-An D. Nguyen
(74) *Attorney, Agent, or Firm*—DLA Piper Rudnick Gray Cary US LLP

(57) ABSTRACT

An environmental monitoring system is disclosed including a plurality of sensors, a plurality of sensor modules each electrically connected to one of the plurality of sensors for generating a ID signal that uniquely identifies the one sensor electrically connected thereto, a plurality of first electrical connectors each electrically connected to one of the sensor modules and a central monitoring unit that includes a plurality of second electrical connectors for connection with the first electrical connectors, a CPU for receiving the ID signals via the first and second electrical connectors for identifying each of the sensors in response to the received ID signals and for configuring operating parameters for each of the identified sensors, and a storage medium for storing sensor data corresponding to the sensor signals. Other elements of the monitoring system can include a power supply, at least one input/output module and calibration ports.

19 Claims, 3 Drawing Sheets

U.S. PATENT DOCUMENTS 5,949,001 A 9/1999 Willeke
5,974,868 A 11/1999 Decain et al.
6,055,480 A 4/2000 Nevo et al.
6,073,036 A 6/2000 Heikkinen et al.
6,076,392 A 6/2000 Drzewiecki
6,103,534 A 8/2000 Stenger et al.
6,167,107 A 12/2000 Bates
6,405,135 B1 * 6/2002 Adriany et al. ................ 702/5
6,460,005 B1 * 10/2002 Chang ........................ 702/132
6,473,660 B1 * 10/2002 Thibault ...................... 700/79
6,525,658 B2 * 2/2003 Streetman et al. .......... 340/522
6,529,591 B1 * 3/2003 Dosani et al. ......... 379/106.03
6,583,720 B1 * 6/2003 Quigley ...................... 340/521
6,661,345 B1 * 12/2003 Bevan et al. ............... 340/575
2002/0116155 A1 * 8/2002 Mayer et al. ............... 702/188

* cited by examiner

ENVIRONMENTAL MONITORING SYSTEM

This application claims the benefit of U.S. Provisional Application No. 60/300,590, filed Jun. 22, 2001, and entitled Environmental Monitoring System with Smart Sensors.

FIELD OF THE INVENTION

This invention relates generally to an environmental monitoring system (EMS) for clean room operation and contamination control, and more particularly to a system that automatically integrates a wide variety of environmental sensors of different types.

BACKGROUND OF THE INVENTION

It is well known to use sensors to monitor the environmental conditions in clean rooms that are used to make, for example, semiconductor devices. Numerous environmental conditions must be maintained, and therefore monitored, to ensure certain clean room specifications are met. Examples of such environmental conditions include temperature, relative humidity, air velocity, differential pressure between clean room areas, airborne particle counts, etc.

Clean room environmental sensors serve several purposes: to create a record of the clean room conditions, to sound an alarm should any environmental parameter fall outside a specified range, and to provide feedback for the systems used to maintain the desired clean room conditions. Typically, a large number of such sensors are used in any given clean room environment, especially if a dozen or more sensors are used to monitor mini-environments at various locations within the clean room. Each such sensor requires it own power source, user interface, and separately configured control device that determines and allows the user to adjust the sensor's operating parameters (e.g. output range scale, set points, calibration, sampling interval, high/low alarm limits, etc.). Thus, installation, configuration and operation of multiple sensor systems can be complicated, time consuming, expensive and redundant.

There is a need for a centralized environmental monitor system that is compatible with and can automatically configure and control a number of sensors and sensor types.

SUMMARY OF THE INVENTION

The present invention solves the aforementioned problems by providing an environmental monitoring system that automatically detects and performs all necessary setup and configuration steps when a sensor is plugged into any of the sensor ports. Operation and monitoring of multiple sensors is performed using a single control device.

Broadly stated, the invention is directed to an environmental monitoring system, including a plurality of sensors, a plurality of sensor modules each electrically connected to one of the plurality of sensors for generating a ID signal that uniquely identifies the one sensor electrically connected thereto, a plurality of first electrical connectors each electrically connected to one of the sensor modules and a central monitoring unit that includes a plurality of second electrical connectors for connection with the first electrical connectors, a CPU for receiving the ID signals via the first and second electrical connectors for identifying each of the sensors in response to the received ID signals and for configuring operating parameters for each of the identified sensors, and a storage medium for storing sensor data corresponding to the sensor signals.

Other elements of the monitoring system can include a power supply for supplying operating power to the sensors via the plurality of first and second electrical connectors, at least one input/output module connected between the second electrical connectors and the CPU for communicating the sensor signals and ID signals received from the sensors and sensor modules to the CPU, at least some of the sensor signals being analog and others of the sensor signals being digital, and calibration ports for the sensor modules for transmitting calibration signals to and from the sensor connected thereto.

Other objects and features of the present invention will become apparent by a review of the specification, claims and appended figures.

DETAILED DESCRIPTION OF THE PREFERRED EMBODIMENTS

The present invention is an integrated, stand-alone clean room environmental monitoring system that integrates sensor configuration, operation and control using a single central unit that provides plug-and-play support for different types of sensors.

Figure 1:
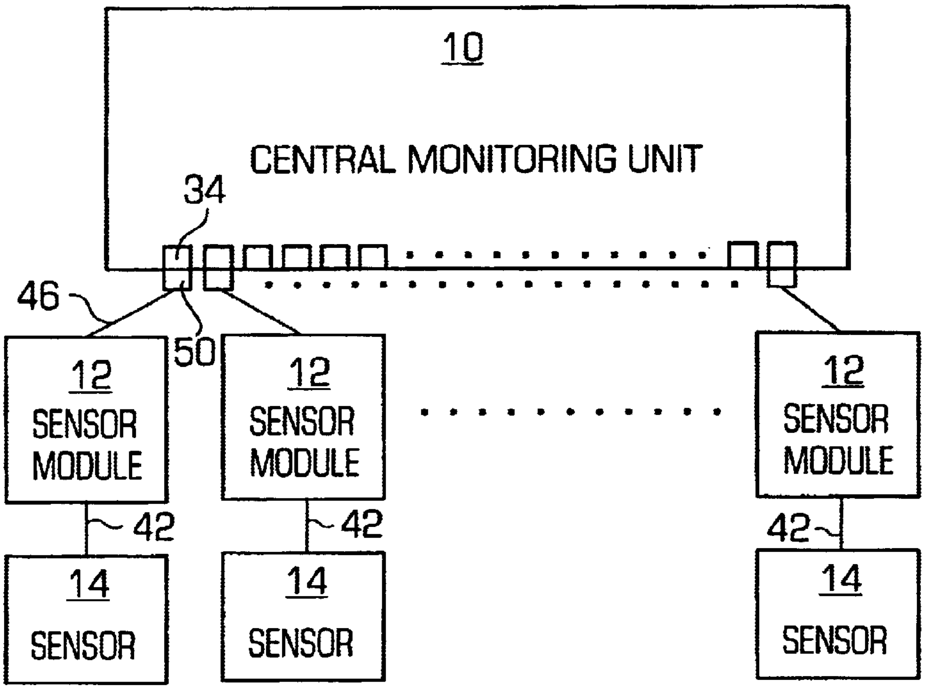
FIG. 1 is a block diagram of the environmental monitoring system of the present invention.

The monitoring system of the present invention is shown in FIG. 1, and includes a central monitoring unit 10, a plurality of sensor modules 12 and a plurality of sensors 14.

Figure 2:
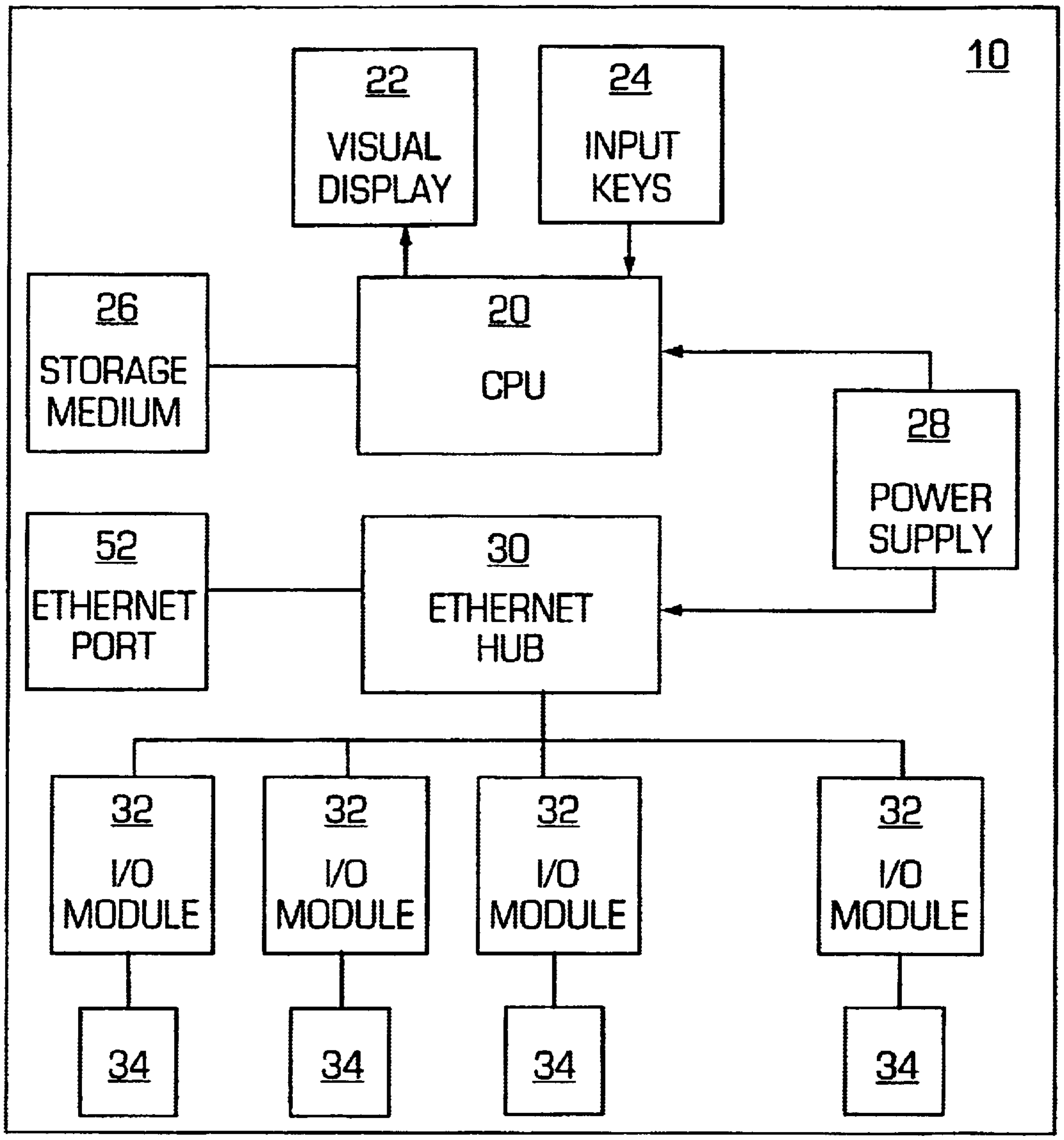
FIG. 2 is a block diagram of the central monitoring unit of the present invention.

The central unit 10 is better shown in FIG. 2, and includes a central processing unit (CPU) 20 that is connected to a visual display 22, input keys 24, a storage medium 26, a power supply 28, and an Ethernet hub 30. Ethernet hub 30 is connected to a plurality of input/output (I/O) modules 32, which in turn are connected to a plurality of external electrical connectors 34. The power supply 28 provides one or more voltages (e.g. 5V, 12V, and/or 24V) not only to provide electrical power to operate the central unit components, but also to operate the sensors 14 and the sensor modules 12.

Visual display 22 and input keys 24, which allow the user to view and manipulate the operation of the monitoring system, can be separate elements as shown in FIG. 2, or can be combined together as a liquid crystal display (LCD) with pressure sensitive "touch screen" input keys. The storage medium 26 can be any digital information storage device (e.g. disc drive, RAM, non-volatile memory, etc.) that can temporarily or permanently store sensor data.

Figure 3:
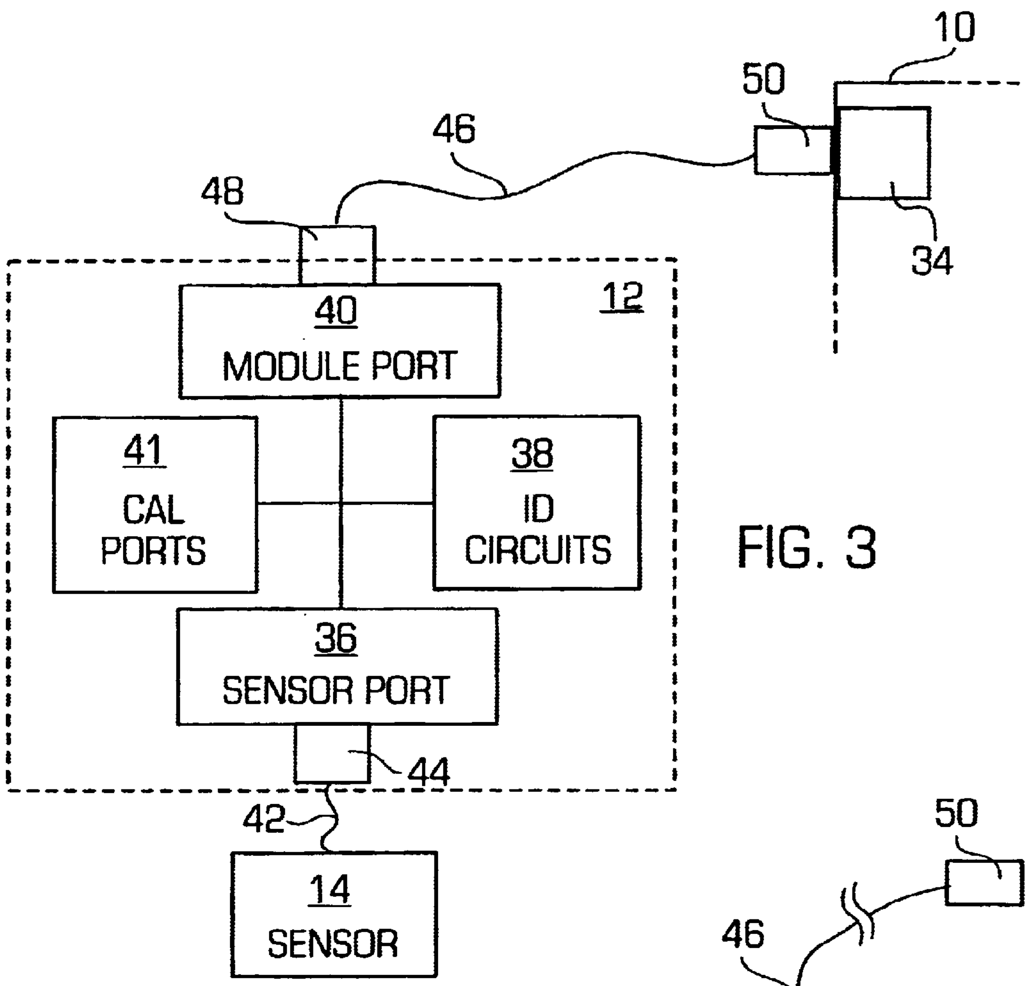
FIG. 3 is a block diagram of the sensor and sensor module of the present invention.

Each of the environmental sensors 14 is connected to one of the external connectors 34 of the central unit 10 via a sensor module 12 as shown in FIG. 3. Each sensor module 12 includes a sensor port 36, an identification (ID) circuit 38, and a module port 40. Sensors 14 can be any conventional sensor device that measures an environmental parameter, such as air flow, humidity, differential pressure, temperature, airborne particle count, etc. Each such sensor 14 includes its own standard sensor cable 42 and terminal connector 44 thereon that connects to a compatible sensor port 36. Different sensors 14 may have different types of terminal connectors 44, and thus the sensor module associated therewith must have a sensor port 36 that is compatible with that terminal connector. A module cable 46 connects between the module 12 and central unit 10, with a first terminal connector 48 at one end that connects with module port 40 and a second terminal connector 50 that connects with one of the external connectors 34. As explained further below, module cable 46 transmits power to the sensor 12 and sensor module 14, and transmits ID information and sensor data to the central unit 10. Calibration ports 41 can be included in sensor module 12 for those sensors that can be or need to be calibrated remotely, where a calibration signal is applied to the sensor, and a calibration return voltage is then measured to ensure proper calibration.

The present invention utilizes smart sensor technology whereby the system automatically identifies and configures sensors that are plugged into external connectors 34. Specifically, once a sensor 14 and sensor module 12 are connected to the central unit 10 as shown in FIG. 3, power is supplied via module cable 46 from the central unit 10 to the sensor module 12 and to sensor 14 to operate both devices. The ID circuit 38 is set to return an ID voltage or current signal back to the central unit 10 via cable 46 that uniquely identifies the sensor 14 connected to the module 12. The ID signal could be a simple analog signal that is generated by converting the supply voltage from the central unit 10 into a unique ID voltage that corresponds to a particular sensor type. Alternately, the ID signal could be a more elaborate digital signal (e.g. using multiple signal lines to generate a unique combination of on/off or low/high states). Once the central unit 10 identifies the sensor type, it then automatically performs all the necessary setup and configuration of the operational parameters for the sensor, including scaling the output range of the sensor, setting any set points, establishing the sampling (data-logging) interval, setting high and low alarm limits, creating the proper graphical display for that specific data, etc. These operational parameters can be modified by the user after the sensor 14 is plugged into the central unit 10 via module 12 and identified, for true plug and play set-up and operation.

Once all the environmental sensors are connected to the central unit 10 via external connectors 34, the system continuously monitors the output from these sensors and records the data therefrom on the storage medium 26. The central unit 10 utilizes Ethernet and software protocols for component communication. A PC or network can be connected to the central unit via an Ethernet port 52 for remote monitoring and/or control, as well as for downloading the recorded data from the storage medium 26. The user can operate and monitor all of the sensors, and can set/modify operating parameters (such as alarm limits and warning levels) for each of the sensors, using a single display 22 and set of input keys 24.

It is desirable to make all the of the second terminal connectors 50 and external connectors 34 the same compatible type, such as CAT 5 or DB9, so that any sensor equipped with a sensor module 12 can be plugged into any of the external connectors 34 in a play-and-plug fashion.

The I/O modules 32 contain the appropriate circuitry (e.g. A/D and D/A converters, voltage supplies, etc.) to allow the CPU 20 to communicate with and operate the sensors identified as being connected to central unit 10. Some clean rooms may utilize some sensors requiring an analog communications protocol (i.e. an analog I/O module 32), and other sensors requiring a digital communications protocol (i.e. a digital I/O module 32). In such a case, some of the I/O modules 32 and the external connectors 34 connected thereto are dedicated to only digital sensors, while the remaining I/O modules 32 and external connectors 34 are dedicated to analog sensors. Connectors 34/50 should then be keyed, labeled, modified or be of a different type to prevent analog sensors from being plugged into digital I/O modules, and vice versa.

If sensor port 36 and terminal connector 44, and/or module port 40 and first terminal connector 48, provide removable electrical connections, it is important to ensure that the type of sensor connected to the sensor module 12 matches the ID circuit 38 in that module so that the sensor is not improperly identified to the central unit 10. Improper identification can be avoided by labeling or keying these connections. Alternately, these connections can be hardwired, non-removable connections (where connectors 44 and 48 are simply hardwired electrical connections).

Figure 4:
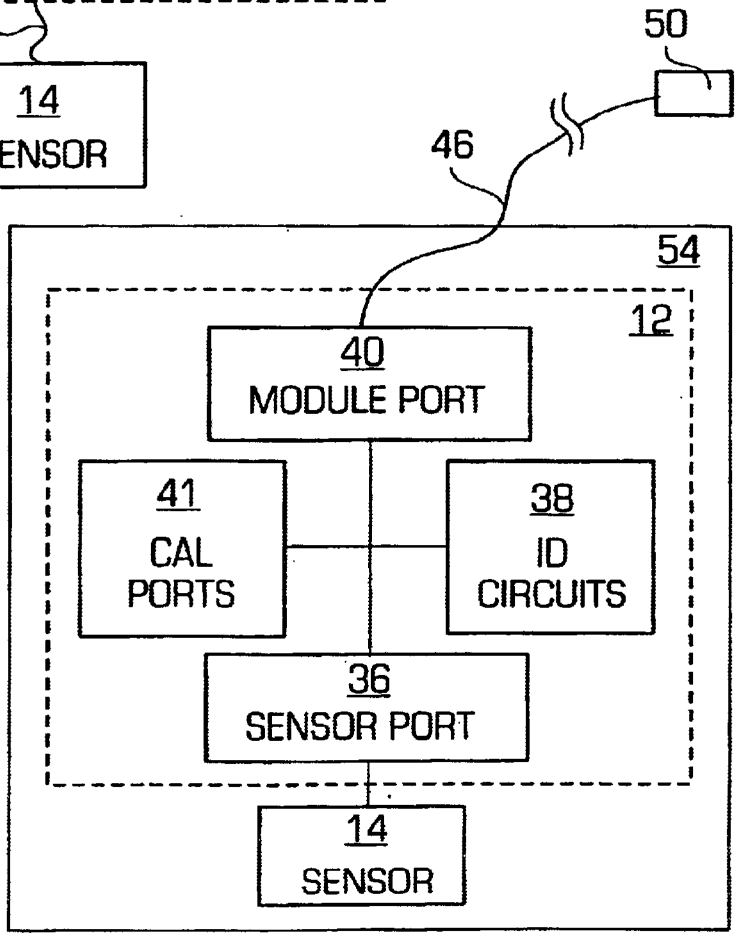
FIG. 4 is a block diagram of the integral sensor and sensor module of the present invention.

Module 12 can be located anywhere between terminal connector 50 and sensor 14. In fact, sensor module 12 can be integrally formed within the housing of connector 50 or sensor 14. For example, FIG. 4 shows in diagram form a standard sensor that has been modified according to the present invention. The sensor's standard communications and power cords have been removed, and a sensor module 12 (e.g. formed on a small PC board) has been installed inside the housing 54 of the sensor assembly and connected to the sensor 14, with the module cable 40 extending from the sensor housing 54. The sensor's power and data signals are supplied and communicated through the sensor module 12 and module cable 46. In most cases, the only outwardly visible change to the standard sensor device will be a different cord extending from the sensor housing, which terminates in an electrical connector 50 compatible with external connectors 34. However, the embedded sensor module 12 inside provides operating power to the sensor, and ID and data signals back to the central unit 10 for proper sensor identification and operation.

Some of the sensors contemplated for use with the present invention include solid state air velocity sensors, capacitive sensing differential pressure sensor, thin film capacitor relative humidity sensors, and platinum RTD temperature sensors. Because all the sensors plugged into central unit 10 are automatically identified, the CPU can also detect the absence of a particular sensor or sensor type.

The present invention provides a single central monitoring unit that automatically supplies all the power needed to operate the sensor devices in the clean room, identifies sensors that are connected to the system, configures appropriate operating parameters without operator intervention, and provides centralized simultaneous control, monitoring and recordation for the plurality of sensors and the data provided thereby. The CPU 20 generates the appropriate display of the data from the sensors on the visual display 22.

It is to be understood that the present invention is not limited to the embodiment(s) described above and illustrated herein, but encompasses any and all variations falling within the scope of the appended claims. For example, while FIG. 2 shows separate I/O modules 32 for each of the external connectors 34, I/O modules 32 can be combined to each support a plurality of external connectors 34. For permanent installations, some or all of the electrical connectors 34/50 could be permanent hardwire connections.

What is claimed is:

1. An environmental monitoring system, comprising:

a plurality of sensors for generating sensor signals responsive to sensed environmental conditions;

a plurality of sensor modules each electrically connected to one of the plurality of sensors and including an electrical circuit for generating a ID signal that uniquely identifies the one sensor electrically connected thereto;

a plurality of cables each having a first end electrically connected to one of the sensor modules and a second end terminating in a first electrical connector; and a central monitoring unit that includes:

a plurality of second electrical connectors for connection with the first electrical connectors, a central processing unit (CPU) for receiving the ID signals via the plurality of cables, for identifying each of the sensors in response to the received ID signals, for configuring operating parameters for each of the identified sensors, and for operating the plurality of sensors in response to the received ID signals, wherein the operation among at least some of the sensors varies in response to the received ID signals, and a storage medium for storing sensor data corresponding to the sensor signals.

2. The environmental monitoring system of claim 1, wherein the central monitoring unit further comprises:

a power supply for supplying operating power to the sensors via the plurality of cables, wherein the operating power supplied to the sensors varies among at least some of the sensors in response to the received ID signals.

3. The environmental monitoring system of claim 1, further comprising:

at least one input/output module connected between the second electrical connectors and the CPU for communicating the sensor signals and ID signals received from the cables to the CPU.

4. The environmental monitoring system of claim 1, wherein at least some of the sensor signals are analog and others of the sensor signals are digital.

5. The environmental monitoring system of claim 4, further comprising:

a plurality of input/output modules connected between the second electrical connectors and the CPU, wherein at least one of the input/output modules communicates the analog sensor signals received from at least one of the cables to the CPU, and another of the input/output modules communicates the digital sensor signals received from at least one of the cables to the CPU.

6. The environmental monitoring system of claim 1, wherein each of the sensor modules further comprises:

calibration ports for transmitting calibration signals to and from the sensor connected thereto.

7. The environmental monitoring system of claim 1, wherein each of the sensors is enclosed in a housing, and each of the sensor modules is disposed in one of the housings.

8. The environmental monitoring system of claim 1, wherein the CPU triggers an alarm in response to one of the operating parameters being outside of a predetermined range.

9. The environmental monitoring system of claim 1, wherein the central monitoring unit further includes a visual display for displaying the sensor data and input keys for inputting information to the CPU.

10. An environmental monitoring system, comprising:

a plurality of sensors for generating sensor signals responsive to sensed environmental conditions;

a plurality of sensor modules each electrically connected to one of the plurality of sensors and including an electrical circuit for generating a ID signal that uniquely identifies the one sensor electrically connected thereto;

a plurality of first electrical connectors each electrically connected to one of the sensor modules; and a central monitoring unit that includes:

a plurality of second electrical connectors for connection with the first electrical connectors, a central processing unit (CPU) for receiving the ID signals via the plurality of first and second electrical connectors, for identifying each of the sensors in response to the received ID signals, for configuring operating parameters for each of the identified sensors, and for operating the plurality of sensors in response to the received ID signals, wherein the operation among at least some of the sensors varies in response to the received ID signals, and a storage medium for storing sensor data corresponding to the sensor signals.

11. The environmental monitoring system of claim 10, wherein the central monitoring unit further comprises:

a power supply for supplying operating power to the sensors via the plurality of first and second electrical connectors, wherein the operating power supplied to the sensors varies among at least some of the sensors in response to the received ID signals.

12. The environmental monitoring system of claim 10, further comprising:

at least one input/output module connected between the second electrical connectors and the CPU for communicating the sensor signals and ID signals received from the sensors and sensor modules to the CPU.

13. The environmental monitoring system of claim 10, wherein at least some of the sensor signals are analog and others of the sensor signals are digital.

14. The environmental monitoring system of claim 13, further comprising:

a plurality of input/output modules connected between the second electrical connectors and the CPU, wherein at least one of the input/output modules communicates the analog sensor signals received from at least one of the cables to the CPU, and another of the input/output modules communicates the digital sensor signals received from at least one of the cables to the CPU.

15. The environmental monitoring system of claim 10, wherein each of the sensor modules further comprises:

calibration ports for transmitting calibration signals to and from the sensor connected thereto.

16. The environmental monitoring system of claim 10, wherein each of the sensors is enclosed in a housing, and each of the sensor modules is disposed in one of the housings.

17. The environmental monitoring system of claim 10, wherein each of the first electrical connectors is enclosed in a housing, and each of the sensor modules is disposed in one of the housings.

18. The environmental monitoring system of claim 10, wherein the CPU triggers an alarm in response to one of the operating parameters being outside of a predetermined range.

19. The environmental monitoring system of claim 10, wherein the central monitoring unit further includes a visual display for displaying the sensor data and input keys for inputting information to the CPU.

* * * * *